Sept. 20, 1960 R. C. GOETTELMAN 2,953,021
ICE DETECTION BY PNEUMATIC ACTUATED SENSING DEVICE
Filed Nov. 3, 1958
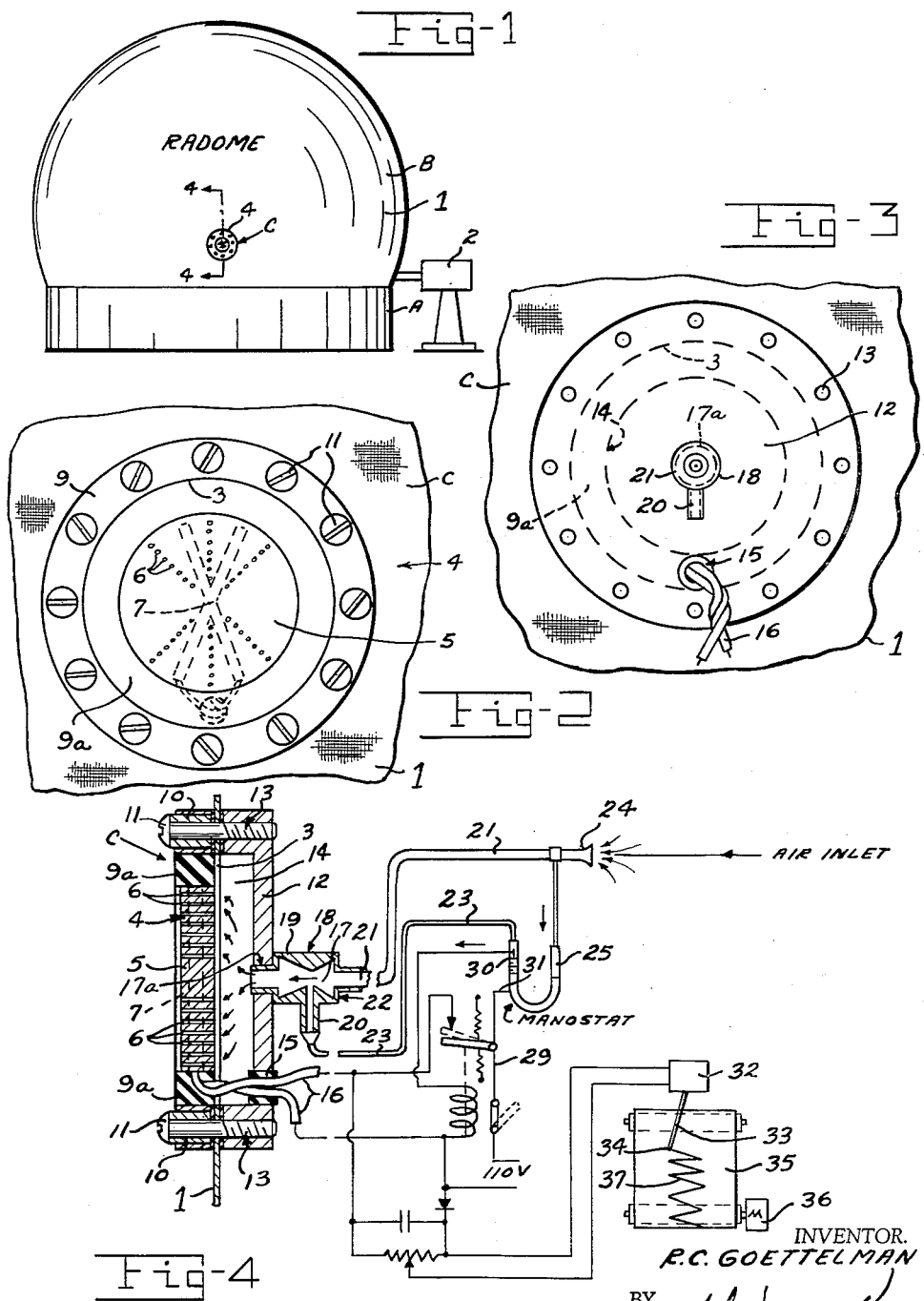
INVENTOR.
R.C. GOETTELMAN
BY
ATTORNEYS United States Patent Office 2,953,021
Patented Sept. 20, 1960

2,953,021

ICE DETECTION BY PNEUMATIC ACTUATED SENSING DEVICE

Robert C. Goettelman, Menlo Park, Calif., assignor to the United States of America as represented by the Secretary of the United States Air Force Filed Nov. 3, 1958, Ser. No. 771,686

10 Claims. (Cl. 73—170)

This invention relates to icing detectors, and more particularly to an icing detector means for radomes, primarily of the inflatable or internally air pressurized type for detecting icing conditions and the severity of such conditions.

A further object is the provision of an icing detector which is clamped over an opening in the side wall of an inflatable radome and utilizes the air pressure within the radome for operating the icing condition indicating apparatus.

A further object is the provision of venturi means and means in the wall of a radome having a chamber and formed with small apertures therethrough adapted to be restricted in area in proportion to icing conditions for discharging air therethrough from the interior of the radome, and including a venturi device for supplying air from the interior of the radome to the interior of said chamber, whereby the flow of air into the chamber through said venturi will be proportional to the discharge of air from the chamber through said apertures to create a pressure differential in the venturi proportional to icing condition of said apertures, and including heater means for deicing said plate and said apertures, and means operable by predetermined variation in said pressure differential for energizing and deenergizing said heater means.

A further object is the inclusion of means operated by the energizing and deenergizing of said heater means for recording the rate of energizing and deenergizing of said heater means per unit of time for recording the severity of the icing conditions.

A further object is the provision of an icing condition indicating device that is simple, inexpensive and easily applied to existing radomes with substantially no modification of the structure and condition of the radome.

Other objects and advantages of the invention will become apparent from the following description and accompanying drawings in which like reference characters refer to like parts in the several figures.

Figure 1 is a side elevation schematically illustrating a radome having my improved icing condition indicating device applied thereto.

Figure 2 is an enlarged fragmentary elevation of a portion of the radome wall showing the icing condition indicating device in elevation, showing the front or outer side thereof.

Figure 3 is a rear view but similar to Figure 2, showing a fragment of the radome wall and the inner or rear side of the icing condition indicating plate in elevation.

Figure 4 is a view taken about on the plane indicated by line 4—4 in Figure 1, diagrammatically illustrating the rest of the apparatus included in my invention.

Referring to Figure 1 the reference letter A denotes a standard base having a standard inflatable or pressurized radome B mounted thereon and having one of my icing condition determining devices incorporated therein as indicated at C.

The conventional thin wall of the inflatable radome is indicated at 1 and is adapted to contain a conventional radar antenna (not shown) and is adapted to be pressurized to some predetermined pressure by a conventional pressure source of air pump as indicated schematically at 2 in Figure 1.

Referring to Figures 2 and 4 the wall 1 is preferably formed with one or more holes or apertures therein, indicated at 3 and one pair of the apertured plates employed in the icing condition determining apparatus is mounted to cover each aperture or opening 3.

These plates comprise an outer plate generally indicated at 4 having a central portion 5 exposed to the opening 3 and having a plurality of small holes or apertures 6 therethrough as seen in Figures 2 and 4. These holes or apertures are preferably disposed in a plurality of radial rows extending outwardly from the center of the plate in different directions. As shown there are six radial rows of seven holes each extending through the plate or plates 4 from front or outside to the back. Each plate is provided with heating means such as an electrical heating resistance element 7 for the purpose of heating the plate when the holes 6 ice over or partly ice over and reduce the operative area of the holes, so as to melt the ice and "clear" the passages or holes 6.

Each plate 4 has a peripheral portion 9 which overlaps the area of the radome wall 1 surrounding the opening 3 and is formed with a circle of equally spaced bolt or fastener receiving holes 10, receiving the fastening or clamping means such as bolts (or screws) 11 passing through the wall 1 of the radome B and similarly arranged fastener receiving opening 13 in a rear or inner plate 12. The inner or heated portion 5 of the plate 4 is heat insulated from the outer or peripheral clamping portion 9 of the plate by an intermediate heat insulation portion 9a.

The rear plate 12, as shown, is the same diameter as the front or outer plate 4 and is solid for closing the space behind the rows of small air discharge apertures 6 and is formed with a central chamber or cavity 14 facing toward the front plate 4 which is in communication with the apertures 6.

The radome wall 1, surrounding the opening 3 is, of course, clamped between the peripheral portions of the outer and inner plates 4 and 12 by the clamping means or screw fasteners 11.

The inner plate 12, as shown, is formed with an opening 15 through which the electric conductors or heater wires 16 extend, connected to the heater 7. The opening 16 is, of course, preferably sealed around the wires 16 to prevent material escape of air between the wires and the opening.

The rear plate 12 is formed with an opening 17a, preferably at its center into which is secured a "venturi" device 18 comprising an enlarged barrel portion 19 having a suction inlet port 20 in its side and an air jet inlet passage 21 in the center of its closed end 22.

Air from the pressurized interior of the radome B (or from a separate source) is discharged through said jet inlet passage 21 transversely across the mouth of the venturi inlet 20 creating a suction in the venturi suction passage or conduit 23 in proportion to the rate of air passing from the jet inlet passage 21 into the cavity 14 through outlet 17a, which suction is preferably maintained substantially uniform and therefore the leakage or discharge of air from the chamber 14 through the radial rows of small apertures or holes 6 controls the rate of introduction of air into the chamber 14 by the jet inlet passage 21 with a result that the degree of suction in the suction passage 23 created by venturi action is similarly proportional to the rate of leakage of the air through the rows of holes 6 in the plate 4.

The plate or plates 4, being outside of the wall 1 of the radome B and exposed to the elements is subject to "icing" when icing conditions in the surrounding atmosphere exist, which causes a progressive icing over condition of the holes 6. This changes or reduces the operative (leakage) area of the holes 6.

As shown in the drawings air from the interior of the radome B enters the mouth 24 of the air jet inlet passage 21 and enters the chamber 14 from the interior of the larger or barrel portion 19 of the venturi device 18 through the central opening 17a. Suction is produced in the suction passage 23 by the venturi effect of the air jet crossing the opening of the suction passage 20 in the venturi in the barrel chamber 19. The other end of the suction passage 23 is connected to one end of a U shape manostat 25, the other end of the manostat 25 being open to the air pressure in the interior of the radome B.

The manostat is conventional and preferably includes an electrically conductive liquid so that a circuit is opened or closed by predetermined movement of the liquid in one leg of the manostat 25 opening or closing contacts 30 and 31.

It is also contemplated that other types of pressure differential responsive devices may be substituted, such as a diaphragm chamber having one side of the diaphragm exposed to the suction in conduit 23 and the other side open to the pressure in the radome, the movement of the diaphragm effecting the closing and opening of electrical contacts energizing or deenergizing a relay device 29.

The relay device 29 as provided, is connected to the manostat contacts 30 and 31 so as to be energized or deenergized by the electrolite column in the manostat 25 depending on the level therein caused by the degree of suction effected by the venturi action aforesaid.

This relay 29 is connected to energize the electric heating element or coil 7 when in one position such as a closed position and to deenergize the heating coil when in its other or second position.

Connected to be simultaneously energized and deenergized is a recording device such as a commercial product known as an "Esterline-Angus" recorder 32 which includes an oscillatable arm 33 having a marker at its end, such as a pen 34 recording on a paper strip 35 which is advanced by a motor or clockwork 36 at a uniform rate. When the holes 6 in the head or plate 4 are clear of ice the venturi suction is greatest and the relay 29 is energized and pen 34 is disposed near one edge of the paper strip 35 and the heater element 7 is also deenergized.

When icing conditions in the atmosphere are present ice begins to build up on the plate 4 and around the apertures 6 and in time the ice formation around the apertures 6 reduces the operative area of these holes 6. This, in turn, reduces the outlet area from the chamber 14 thus reducing the air discharge from the barrel chamber 19. This in turn reduces the suction in the conduit 23 caused by the venturi action which causes a reduction of suction in the suction passage 23 to the manostat thus causing the electrolite liquid in the manostat tube to leave the upper contact 30 and deenergize the relay 29 which in turn causes the relay to close the circuit to the heater device 7 in the plate 4 and simultaneously energize the recording device 32 causing the pen 34 to move to the other edge of the paper strip 35. When the heater 7 melts the ice formation on the plate 4 sufficiently to clear the holes 6 the relay is energized to "cut out" the heater coil 7 and deenergize the recording device.

It will, of course, be observed that the rate at which this energizing and deenergizing of the heating coil takes place is proportional to the icing conditions or rate at which the plate 4 alternately cools and icing over of the holes 6 reoccurs. Since the paper strip 35 is advanced at a uniform rate by the motor or clockwork 36 the number of oscillations of the pen 34 and the zigzag marking 37 recorded therefrom per unit of time records the degree or severity of the icing conditions.

When the line 47 on the paper strip 35 is straight adjacent one edge little or no icing conditions exist. When a back and forth or zigzag line is recorded on the paper strip and the back and forth traces are far apart, lower or less severe icing conditions are present in the atmosphere outside the radome to which the outer surface of the plate 4 is subjected. As the icing conditions become more severe the recorded zigzag lines or traces 37 recorded on the recording device 32 become closer together.

While my invention has been described as mounted in the wall of a radome which is pressurized and the inflation air for the radome is utilized to provide the venturi fluid medium for operating my icing condition determining device it is also contemplated that the device may be mounted exteriorly of the radome and connected to the interior of the radome by a conduit to supply the radome pressurizing medium to the venturi device for operating icing condition determining device.

It is also contemplated within the purview of the invention as defined in the claims to provide an icing condition determining device which is separate and independent of the radome and its air inflation means. In this event the apertured plate 4 and its complemental rear or back plate such as plate 12 with the cavity 14 therein would be mounted or suitably supported in contact in an external atmosphere which is subject to conditions where icing of the front face of the plate 4 may take place. A suitable pressure source or pump will be provided for supplying a substantially constant air pressure to the venturi jet orifice inlet passage 21 of a venturi device such as the venturi 18 having a suction inlet 23 to the venturi throat and a pressure fluid outlet 17a in communication with the interior of the cavity 14 of the rear plate 12 for supplying air to a multitude of small holes 6 subject to icing over when icing conditions exist, the plate 4 being provided with an electrical heating element or coil such as 7 mounted in or adjacent the plate 4 for heating the same to deice the holes 6. The differential pressure actuated switch device such as 25 may be connected as before described, one side open to the pressure medium or to atmosphere and the other side connected to the suction conduit from the venturi, the device being connected to relay means 29 as before described and to a suitable recorder 32 such as previously described, the device 32 working as before indicated, namely when the holes 6 become iced sufficiently to reduce the pressure leakage area the venturi action is reduced causing the relay 29 to energize the heater 7, and to deenergize the heater when the ice has melted.

It should be noted that the ring portion 9a of the plate 4 between the central portion 5 of the plate 4 and the peripheral clamping portion 9 is provided to heat insulate the central portion from the outer or peripheral portion when the device is clamped over the opening 3 in the thin wall 1 of the radome B.

It will, of course, be understood that various changes may be made in form, detail proportions, and arrangements of the several parts without departing from the spirit and scope of my invention, and the drawing and description are to be taken as exemplary and not in a limiting sense, limited only by the scope of the appended claims.

I claim:

1. In an icing condition determining device, an inflatable container having an outer surface subject to icing conditions, means for supplying air to the interior of the container at a substantially predetermined rate, an aperture through the wall of the container, an icing condition determining plate secured across said aperture to substantially close the opening, said plate having an outer surface subject to icing conditions on the outside of said container, said plate having a plurality of small apertures therethrough adapted to be varied in operative area by icing conditions on the surface of said plate, an electrical heater connected to said plate for thawing the ice therefrom, a closure for the rear face of said plate having a pressure chamber in back of said small apertures in communication therewith, a conduit connecting the interior of said container to the interior of said chamber, a venturi in said conduit adjacent said chamber, a suction conduit connecting said venturi at its point of relative lower pressure, a U shape manostat having one leg open to the interior of said container and the other leg connected to said suction conduit, a relay device for energizing and deenergizing said electrical heater, and contact means carried by said manostat device for deenergizing said relay to energize said heater upon a decrease of suction in said suction conduit, and to energize said relay to deenergize said heater upon a predetermined increase in suction in said suction conduit, a recorder connected to said relay device for recording the rate of energizing and deenergizing of said relay to indicate the degree of icing conditions on said plate surrounding said small apertures.

2. In an icing condition determining device for an inflatable radome device having means to supply a substantially constant air pressure to the interior of the radome for maintaining the radome inflated at a substantially uniform pressure, said device comprising a plate secured across an opening in the wall of said radome and subject to the icing conditions on the said wall, a pressure chamber, said plate defining one wall of said pressure chamber and small air discharge holes extending through said plate from said chamber to the outer surface of said plate for the restricted escape of air entering said chamber, said holes being subject to icing conditions outside of the radome to vary the operative area thereof, an electrical heater connected to said plate to melt ice on said plate around said holes during icing conditions including a heating circuit therefor, a relay device connected to said heater for opening and closing said heating circuit having a first position to energize said heater and a second position to deenergize said heater, a conduit establishing communication between the interior of said radome and the interior of said chamber for supplying air pressure into said chamber, venturi means in said conduit having a venturi suction inlet, a differential pressure operated electrical contact means for opening and closing the heating circuit connected between said conduit and said suction inlet upstream from said venturi means for effecting movement of said relay to said first position to energize said heater when the relative suction in said suction inlet decreases due to an increase in pressure in said chamber caused by icing of said small apertures, and to cause said relay device to move to said second position to deenergize said heater when the suction in said suction inlet increases due to removal of ice from said small operation and to increase the flow of air through said venturi, and means connected to said relay device for indicating the rate of actuation of said relay device to determine the severity of icing of said plate and holes per predetermined unit of time.

3. In an icing condition determining device for an inflatable radome device having means connected thereto to supply a substantially constant air pressure to the interior of the radome for maintaining the radome inflated at a substantially constant pressure, said first device comprising a plate secured across an opening in the wall of said radome and subject to the icing conditions on the said wall, a pressure chamber, said plate defining one wall of said pressure chamber and small air discharge holes extending through said plate from said chamber to the outer surface of said plate for the restricted escape of air entering said chamber, said holes being subject to icing conditions to vary the operative area thereof, an electrical heater connected to said plate to melt ice on said plate around said holes including a heating circuit therefor, a relay device connected to said heater for opening and closing the heating circuit thereto having a first position to energize said heater and a second position to deenergize said heater, a conduit establishing communication between the interior of said radome and the interior of said chamber for supplying air pressure from the radome into said chamber, venturi means in said conduit having a venturi suction inlet, a differential pressure operated electrical contact means for opening and closing the heating circuit connected between said conduit and said suction inlet upstream from said venturi means for effecting movement of said relay to said first position to energize said heater when the relative suction in said suction inlet decreases due to an increase in pressure in said chamber caused by icing of said small apertures and to cause said relay device to move to said second position to deenergize said heater when the suction in said suction inlet increases due to removal of ice from said small apertures and the corresponding increase of the flow of air through said venturi.

4. In an icing condition determining device, a support having a closed chamber therein, a plurality of small apertures extending therethrough into said chamber and having an outer surface adapted to be exposed to icing conditions for varying the operative area of said apertures according to said icing condition, main conduit means connected to said chamber including means for forcing air at a substantially predetermined pressure through said main conduit means into said chamber and through said apertures to the outer surface, a venturi device in said main conduit means having a suction conduit leading therefrom for creating a relatively negative pressure relative to the pressure in said main conduit means proportional to the rate of flow of air through said venturi, a heater connected to said support for heating and reducing icing conditions on the outer surface and said small apertures in said support, an electrical heating circuit for said heater including differential pressure operated means connected between the suction conduit and the main conduit means for energizing said heating circuit when the suction in said suction conduit decreases below a predetermined relative pressure, and deenergizing said heating circuit when the suction in said suction conduit increases above said predetermined pressure.

5. In an icing condition determining device, a support having a closed chamber therein, a plurality of small apertures extending therethrough into said chamber and having an outer surface adapted to be exposed to icing conditions for varying the operative area of said apertures according to said icing condition, main conduit means connected to said chamber including means for forcing air at a substantially predetermined pressure through said main conduit means into said chamber and through said apertures to the outer surface, a venturi device in said main conduit means having a suction conduit leading therefrom for creating a relatively negative pressure relative to the pressure in said main conduit means proportional to the rate of flow of air through said venturi, a heater connected to said support for heating and reducing icing conditions on the outer surface and said small apertures in said support, an electrical heating circuit for said heater including differential pressure operated means connected between the suction conduit and the main conduit means for energizing said heating circuit when the suction in said suction conduit decreases below a predetermined relative pressure, and deenergizing said heating circuit when the suction in said suction conduit increases above said predetermined pressure, an electrical indicating means connected in said heating circuit for indicating the rate at which the heating circuit is energized and deenergized for determining the degree of icing conditions per unit of time.

6. An icing indicator device for a pressurized radome, comprising a pair of complementary outer and inner clamping plates adapted to receive and clamp the wall of a radome therebetween surrounding an opening in the radome, said plates defining a pressure chamber therebetween, said outer plate being subject to icing conditions exterior of the radome and formed with a plurality of small air escape apertures therethrough from said chamber adapted to ice up and reduce the area thereof, a heater element carried by said plates for heating the outer plate to deice the same when icing conditions are present, a venturi device connected to said pressure chamber having a venturi suction inlet, and an air pressure supply conduit extending through said venturi device in communication at one end with the interior of said chamber and adapted to receive air from the interior of the pressurized radome at the other end and a differential pressure operated device connected at one end to said suction inlet and at the other end upstream from said venturi device to said pressure supply conduit, said differential pressure operated device including a relay device, an energizing circuit for said heater element connected to said relay device for energizing said heater element upon decrease in said differential pressure and deenergizing said heater element upon an increase in said differential pressure.

7. An icing indicator device for a pressurized radome, comprising a pair of complementary outer and inner clamping plates adapted to receive and clamp the wall of a radome therebetween surrounding an opening in the radome, said plates defining a pressure chamber therebetween, said outer plate being subject to icing conditions exterior of the radome and formed with a plurality of small air escape apertures therethrough from said chamber adapted to ice up and reduce the area thereof, a heater element carried by said plates for heating the outer plate to deice the same when icing conditions are present, a venturi device connected to said pressure chamber having a venturi suction inlet, and an air pressure supply conduit extending through said venturi device in communication at one end with the interior of said chamber and adapted to receive air from the interior of the pressurized radome at the other end and a differential pressure operated device connected at one end to said suction inlet and at the other end upstream from said venturi device to said pressure supply conduit, said differential pressure operated device including a relay device, an energizing circuit for said heater element connected to said relay device for energizing said heater element upon decrease in said differential pressure and deenergizing said heater element upon an increase in said differential pressure, in which said relay device is operated by relative increase and reduction of pressure in said venturi suction inlet relative to the pressure in the air pressure supply conduit to circuit closing and opening positions respectively for energizing said heater element when said pressure differential decreases below a predetermined amount and deenergizing said heater element when said pressure differential increases above said predetermined amount.

8. An icing indicator device for a pressurized radome, comprising a pair of complementary outer and inner clamping plates adapted to receive and clamp the wall of a radome therebetween surrounding an opening in the radome, said plates defining a pressure chamber therebetween, said outer plate being subject to icing conditions exterior of the radome and formed with a plurality of small air escape apertures therethrough from said chamber adapted to ice up and reduce the area thereof, a heater element carried by said plates for heating the outer plate to deice the same when icing conditions are present, a venturi device connected to said pressure chamber having a venturi suction inlet, and an air pressure supply conduit extending through said venturi device in communication at one end with the interior of said chamber and adapted to receive air from the interior of the pressurized radome at the other end and a differential pressure operated device connected at one end to said suction inlet and at the other end upstream from said venturi device to said pressure supply conduit, said differential pressure operated device including a relay device, an energizing circuit for said heater element connected to said relay device for energizing said heater element upon decrease in said differential pressure and deenergizing said heater element upon an increase in said differential pressure, in which said relay device is operated by relative increase and reduction of pressure in said venturi suction inlet relative to the pressure in the air pressure supply conduit to circuit closing and opening positions respectively for energizing said heater element when said pressure differential decreases below a predetermined amount and deenergizing said heater element when said pressure differential increases above said predetermined amount, including recording means connected to said heater element for recording the rate of energizing and deenergizing said heater element per unit of time.

9. In an icing condition determining apparatus, a support having a front surface subject to icing over conditions in the atmosphere when icing conditions are present, said support having a rear surface and a closed pressure chamber between said front and rear surfaces, said support having a plurality of small apertures extending from said pressure chamber through said front surface for the restricted discharge of a pressure fluid from said chamber, venturi means having a venturi passage connected to the interior of said chamber, said venturi means having a pressure fluid inlet and a suction inlet, means for supplying pressure fluid to said pressure fluid inlet at a substantially uniform rate, differential pressure operated means connected between said suction inlet and said pressure fluid supply means, and means operable by said differential pressure operated means for removing ice from said front surface when ice accumulates thereon and reduces the operative area of said apertures to retard the leakage of the pressure fluid from said chamber to cause a reduction of flow of the pressure fluid through said venturi with corresponding reduction in the pressure differential in said differential pressure operated means, and operable when ice is removed from said apertures to restore the leakage of the pressure fluid from said chamber through said apertures to discontinue the operating of said ice removing means.

10. Apparatus as set forth in claim 9, including means for recording the rate of alternate actuation and interruption of the ice removing means.

References Cited in the file of this patent
UNITED STATES PATENTS
2,229,740    Helmore    Jan. 28, 1941